(12) United States Patent
Sahlin et al.

(10) Patent No.: US 10,411,854 B2
(45) Date of Patent: Sep. 10, 2019

(54) PAYLOAD TRANSMISSION IN A SUBFRAME

(71) Applicant: TELEFONAKTIEBOLAGET L M ERICSSON (PUBL), Stockholm (SE)

(72) Inventors: Henrik Sahlin, Mölnlycke (SE); Jingya Li, Göteborg (SE); Niklas Andgart, Södra Sandby (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 538 days.

(21) Appl. No.: 14/890,446

(22) PCT Filed: Nov. 4, 2015

(86) PCT No.: PCT/EP2015/075659
§ 371 (c)(1),
(2) Date: Nov. 11, 2015

(87) PCT Pub. No.: WO2017/076438
PCT Pub. Date: May 11, 2017

(65) Prior Publication Data
US 2017/0257199 A1    Sep. 7, 2017

(51) Int. Cl.
*H04W 72/04* (2009.01)
*H04L 5/00* (2006.01)

(52) U.S. Cl.
CPC ....... *H04L 5/0044* (2013.01); *H04W 72/0406* (2013.01); *H04W 72/0446* (2013.01); *H04W 72/0453* (2013.01); *H04L 5/0092* (2013.01)

(58) Field of Classification Search
CPC ... H04L 5/0044; H04L 1/0084; H04L 1/0078; H04L 1/0089; H04L 47/36; H04L 47/365; H04W 36/06; H04W 72/0446; H04W 28/26; H04W 72/1205
See application file for complete search history.

(56) References Cited

U.S. PATENT DOCUMENTS

| | | | |
|---|---|---|---|
| 9,030,977 B2* | 5/2015 | Chen | H04B 7/15542 370/310 |
| 9,282,567 B2* | 3/2016 | Golitschek Edler von Elbwart | H04B 7/2656 |
| 9,705,654 B2* | 7/2017 | Ahmadi | H04L 5/0053 |

(Continued)

OTHER PUBLICATIONS

3GPP. 3rd Generation Partnership Project; Technical Specification Group Radio Access Network; Evolved Universal Terrestrial Radio Access (E-UTRA); Physical layer procedures (Release 12) 3GPP TS 36.213 V12.7.0 (Sep. 2015).

(Continued)

*Primary Examiner* — Brian D Nguyen

(57) ABSTRACT

There is provided mechanisms for transmitting payload in a subframe. A method is performed by a first network device. The method comprises obtaining a transport block size (TBS) value by accessing an array storing a plurality of TBS values. The TBS value is proportional to number of user data symbols in a subframe of a given subframe length. One and the same array is accessed regardless of the given subframe length. The method comprises transmitting a physical channel carrying payload in the subframe to a second network device. The amount of data in the payload is determined by the TBS value.

21 Claims, 4 Drawing Sheets

(56) References Cited

U.S. PATENT DOCUMENTS

| | | | |
|---|---|---|---|
| 2008/0043657 A1* | 2/2008 | Ishii | H04L 1/0003 |
| | | | 370/311 |
| 2010/0195614 A1* | 8/2010 | Nimbalker | H04W 72/1289 |
| | | | 370/330 |
| 2011/0090808 A1 | 4/2011 | Chen et al. | |
| 2015/0063280 A1* | 3/2015 | Nan | H04L 1/0006 |
| | | | 370/329 |
| 2015/0085794 A1 | 3/2015 | Chen et al. | |
| 2015/0304995 A1* | 10/2015 | Yi | H04L 5/001 |
| | | | 370/329 |
| 2016/0081107 A1* | 3/2016 | Yang | H04L 5/001 |
| | | | 370/280 |
| 2017/0223686 A1* | 8/2017 | You | H04L 5/0048 |

OTHER PUBLICATIONS

3GPP. 3rd Generation Partnership Project; Technical Specification Group Radio Access Network; Evolved Universal Terrestrial Radio Access (E-UTRA); Multiplexing and channel coding (Release 12). 3GPP TS 36.212 V12.6.0 (Sep. 2015).

Panasonic: "TBS Selection for Downlink Partial Subframes", 3GPP Draft; RI-155354, 3rd Generation Partnership Project (3GPP), Mobile Competence Centre ; 650, Route Des Lucioles , F-06921 Sophia-Antipolis Cedex; France vol. RAN WGI, No. Malmo, Sweden; Oct. 5, 2015-Oct. 9, 2015. Oct. 4, 2015 (Oct. 4, 2015).

* cited by examiner

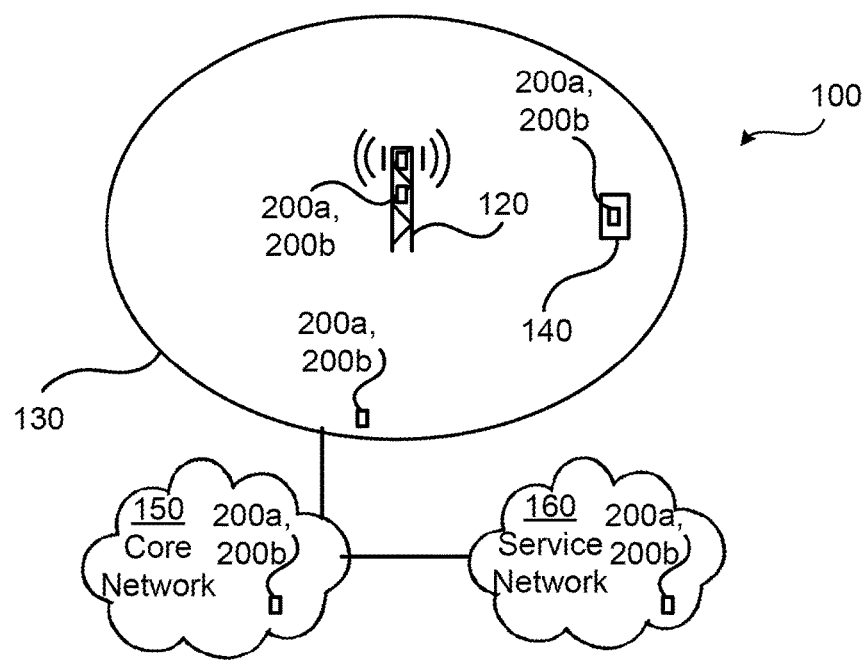
Fig. 1
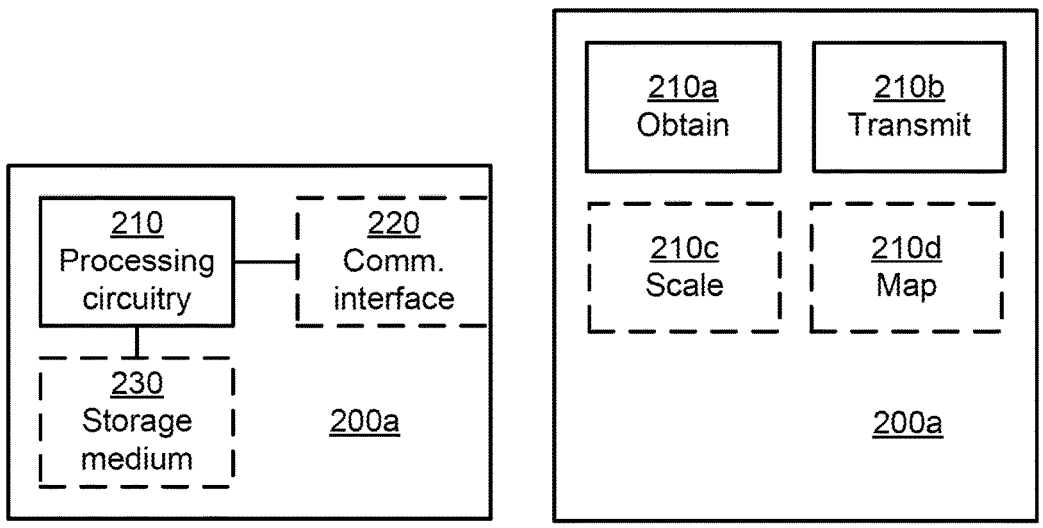
Fig. 2a
Fig. 2b

800

| 16 | 296 | 600 | 1096 | 1928 | 3240 | 6200 | 11832 | 22920 | 43816 |
|---|---|---|---|---|---|---|---|---|---|
| 24 | 328 | 616 | 1128 | 1992 | 3368 | 6456 | 12216 | 23688 | 45352 |
| 32 | 336 | 632 | 1160 | 2024 | 3496 | 6712 | 12576 | 24496 | 46888 |
| 40 | 344 | 648 | 1192 | 2088 | 3624 | 6968 | 12960 | 25456 | 48936 |
| 56 | 376 | 680 | 1224 | 2152 | 3752 | 7224 | 13536 | 26416 | 51024 |
| 72 | 392 | 696 | 1256 | 2216 | 3880 | 7480 | 14112 | 27376 | 52752 |
| 88 | 408 | 712 | 1288 | 2280 | 4008 | 7736 | 14688 | 28336 | 55056 |
| 104 | 424 | 744 | 1320 | 2344 | 4136 | 7992 | 15264 | 29296 | 57336 |
| 120 | 440 | 776 | 1352 | 2408 | 4264 | 8248 | 15840 | 30576 | 59256 |
| 136 | 456 | 808 | 1384 | 2472 | 4392 | 8504 | 16416 | 31704 | 61664 |
| 144 | 472 | 840 | 1416 | 2536 | 4584 | 8760 | 16992 | 32856 | 63776 |
| 152 | 488 | 872 | 1480 | 2600 | 4776 | 9144 | 17568 | 34008 | 66592 |
| 176 | 504 | 904 | 1544 | 2664 | 4968 | 9528 | 18336 | 35160 | 68808 |
| 208 | 520 | 936 | 1608 | 2728 | 5160 | 9912 | 19080 | 36696 | 71112 |
| 224 | 536 | 968 | 1672 | 2792 | 5352 | 10296 | 19848 | 37888 | 73712 |
| 256 | 552 | 1000 | 1736 | 2856 | 5544 | 10680 | 20616 | 39232 | 75376 |
| 280 | 568 | 1032 | 1800 | 2984 | 5736 | 11064 | 21384 | 40576 | |
| 288 | 584 | 1064 | 1864 | 3112 | 5992 | 11448 | 22152 | 42368 | |

Fig. 8

PAYLOAD TRANSMISSION IN A SUBFRAME

TECHNICAL FIELD

Embodiments presented herein relate to transmitting payload in a subframe, and particularly to a method, a network device, a computer program, and a computer program product for transmitting payload in a subframe.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is packet data latency. Latency measurements can be performed in all stages of the communications network, for example when verifying a new software release or system component, and/or when deploying the communications network and when the communications network is in commercial operation.

Shorter latency than previous generations of 3GPP radio access technologies was one performance metric that guided the design of Long Term Evolution (LTE). LTE is also now recognized by the end-users to be a system that provides faster access to internet and lower packet latencies than previous generations of mobile radio technologies.

Packet latency is also a parameter that indirectly influences the throughput of the communications network. Traffic using the Hypertext Transfer Protocol (HTTP) and/or the Transmission Control Protocol (TCP) is currently one of the dominating application and transport layer protocol suite used on the Internet. The typical size of HTTP based transactions over the Internet is in the range of a few 10's of Kilo byte up to 1 Mega byte. In this size range, the TCP slow start period is a significant part of the total transport period of the packet stream. During TCP slow start the performance is packet latency limited. Hence, improved packet latency can potentially improve the average throughput, at least for this type of TCP based data transactions.

Radio resource efficiency could also be positively impacted by packet latency reductions. Lower packet data latency could increase the number of transmissions possible within a certain delay bound; hence higher Block Error Rate (BLER) targets could be used for the data transmissions freeing up radio resources potentially improving the capacity of the system.

Data on a transport channel between communicating devices in the communications network is transmitted in units known as Transport Blocks (TB), each of which corresponds to a Medium Access Control (MAC) layer Protocol Data Unit (PDU). In LTE release 10, within each transmission time interval (TTI), corresponding to one subframe duration of 1 ms, up to two TBs of dynamic size are delivered from MAC layer to the physical (PHY) layer and transmitted over the radio interface. The number of TBs transmitted within a TTI depends on configuration of multi-antenna transmission schemes. Associated with each TB is a transport format, specifying how the TB is to be transmitted. The transport format includes information about the Transport Block Size (TBS), the Modulation- and Coding Scheme (MCS), and the antenna mapping.

In order to reduce the impacts of packet latency it has therefore been proposed to shorten the subframe length. The existing TBS tables, as given in 3GPP TS 36.213, Section 7.1.7.2., are defined for a fixed length TTI of 1 ms. For a given number of assigned resource blocks, the number of available resource elements for data transmission within a shortened subframe can be significantly less as compared to the case of the legacy 1 ms TTI. Thus, the existing TBS tables cannot be used for supporting shortened subframes.

Hence, there is a need to find TBS values that are suitable for short subframes.

SUMMARY

An object of embodiments herein is to provide efficient determination of TBS values that are suitable for short subframes.

According to a first aspect there is presented a method for transmitting payload in a subframe. The method is performed by a first network device. The method comprises obtaining a transport block size (TBS) value by accessing an array storing a plurality of TBS values. The TBS value is proportional to number of user data symbols in a subframe of a given subframe length. One and the same array is accessed regardless of the given subframe length. The method comprises transmitting a physical channel carrying payload in the subframe to a second network device. The amount of data in the payload is determined by the TBS value.

According to a second aspect there is presented a network device for transmitting payload in a subframe. The network device comprises processing circuitry. The processing circuitry is configured to cause the network device to obtain a TBS value by accessing an array storing a plurality of TBS values. The TBS value is proportional to number of user data symbols in a subframe of a given subframe length. One and the same array is accessed regardless of the given subframe length. The processing circuitry is configured to cause the network device to transmit a physical channel carrying payload in the subframe to a second network device. The amount of data in the payload is determined by the TBS value.

According to a third aspect there is presented a network device for transmitting payload in a subframe. The network device comprises processing circuitry. The network device comprises a computer program product. The computer program stores instructions that, when executed by the processing circuitry the instructions cause the network device to obtain a TBS value by accessing an array storing a plurality of TBS values. The TBS value is proportional to number of user data symbols in a subframe of a given subframe length. One and the same array is accessed regardless of the given subframe length. When executed by the processing circuitry the instructions cause the network device to transmit a physical channel carrying payload in the subframe to a second network device. The amount of data in the payload is determined by the TBS value.

According to a fourth aspect there is presented a network device for transmitting payload in a subframe. The network device comprises an obtain module configured to obtain a TBS value by accessing an array storing a plurality of TBS values. The TBS value is proportional to number of user data symbols in a subframe of a given subframe length. One and the same array is accessed regardless of the given subframe length. The network device comprises a transmit module configured to transmit a physical channel carrying payload in the subframe to a second network device. The amount of data in the payload is determined by the TBS value.

According to a fifth aspect there is presented a computer program for transmitting payload in a subframe, the computer program comprising computer program code which, when run on a network device, causes the network device to perform a method according to the first aspect.

According to a sixth aspect there is presented a computer program product comprising a computer program according to the fifth aspect and a computer readable storage medium on which the computer program is stored. The computer readable storage medium can be a non-transitory computer readable storage medium.

Advantageously this method, these network devices and this computer program enables the TBS values to be determined in an efficient manner, even for short subframes.

Advantageously this method, these network devices and this computer program enables reuse of existing TBS tables, which have been defined in 3GPP TS 36.213. This implies minimum modifications for standardization specifications. Reusing the existing TBS tables also implies that desired properties required for practical implementation are all kept for determination of the TBS value.

Advantageously this method, these network devices and this computer program enables reuse of existing link adaptation (or equivalently, adaptive modulation and coding) algorithms for PDSCH and PUSCH. The same modulation and coding scheme can be used independent of the number of OFDM symbols or SC-FDMA symbols in the subframe.

It is to be noted that any feature of the first, second, third, fourth, fifth and sixth aspects may be applied to any other aspect, wherever appropriate. Likewise, any advantage of the first aspect may equally apply to the second, third, fourth, fifth, and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 1 is a schematic diagram illustrating a communication network according to embodiments;

FIG. 2a is a schematic diagram showing functional units of a network device name according to an embodiment;

FIG. 2b is a schematic diagram showing functional modules of a network device name according to an embodiment;

FIG. 8 schematically illustrates an array of unique transport block size values.

DETAILED DESCRIPTION

Figure 3:
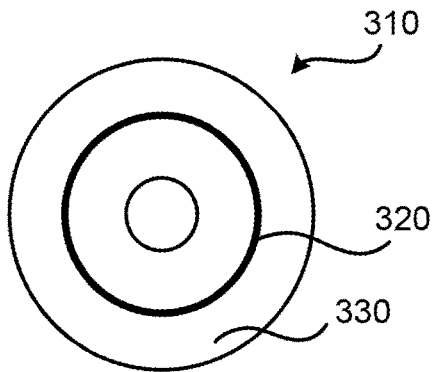
FIG. 3 shows one example of a computer program product comprising computer readable storage medium according to an embodiment.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

FIG. 1 is a schematic diagram illustrating a communications network 100 where embodiments presented herein can be applied.

The communications network 100 comprises at least one network device denoted a first network device 200a and at least one network device denoted second network device 200b. The functionality of the first network device 200a and how it interacts with the second network device 200b will be disclosed below.

Each of the at least one first network device 200a and the a least one second network device 200b may be provided in, or installed on, a radio access network node 120 or in another entity or device in a radio access network 130, in an entity or device of a core network 150, in an entity or device of a service network 160, or a wireless device 140.

Examples of wireless devices 140 include, but are not limited to, mobile stations, mobile phones, handsets, wireless local loop phones, user equipment (UE), smartphones, laptop computers, and tablet computers. Examples of radio access network nodes 120 include, but are not limited to, radio base stations, base transceiver stations, nodeBs, evolved nodeBs, and access points. As the skilled person understands, the communications network 100 may comprise a plurality of radio access network nodes 120, each providing network access to a plurality of wireless devices 140. The herein disclosed embodiments are no limited to any particular number of radio access network nodes 120 or wireless devices 140.

Data on a transport channel between the first network device 200a and the second network device 200b is transmitted in units known as Transport Blocks (TB), each of which corresponds to a Medium Access Control (MAC) layer Protocol Data Unit (PDU). In LTE release 10, within each TTI, corresponding to one subframe duration of 1 ms, up to two TBs of dynamic size are delivered from MAC layer to the physical (PHY) layer and transmitted over the radio interface. The number of TBs transmitted within a TTI depends on configuration of multi-antenna transmission schemes.

Associated with each TB is a transport format, specifying how the TB is to be transmitted. The transport format includes information about the Transport Block Size (TBS), the Modulation- and Coding Scheme (MCS), and the antenna mapping. Each transmission is done by using a number of Physical Resource Blocks (PRB) where one PRB corresponds to 12 sub-carriers. One sub-carrier for one Orthogonal Frequency-Division Multiplexing (OFDM) symbol or Single-Carrier Frequency-Division Multiple Access (SC-FDMA) symbol is denoted as a Resource Element (RE). In downlink (i.e. wherein the first network device 200a is part of the network, wherein the second network device 200b is part of the wireless device 140, and wherein the first network device 200a is transmitting data to the second network device 200b), some of the RE within one OFDM symbol can be allocated to reference symbols while other REs in the same OFDM symbol are used for user data. This is contrast to uplink (i.e. wherein the first network device 200a is part of the wireless device 140, wherein the second network device 200b is part of the network, and wherein the first network device 200a is transmitting data to the second network device 200b) where all REs of a SC-FDMA symbol is either allocated to user data or allocated to reference signals.

The transport formats for a Physical Downlink Shared Channel (PDSCH) and Physical Uplink Shared Channel (PUSCH) data transmission are signaled in the corresponding Downlink Control Information (DCI) format on the Physical Downlink Control Channel (PDCCH) or enhanced PDCCH (ePDCCH). A number of different DCI formats are specified in 3GPP TS 36.212, for the scheduling of PUSCH and PDSCH, in which the number of RBs and the MCS for each TB are specified. The TB size (TBS) is determined by the MCS together with the number of resource blocks assigned, information provided in the corresponding DCI format. The available TBSs are specified in 3GPP TS 36.213, section 7.1.7.2 for downlink and section 8.6.2 for uplink. However, the same TBS tables as specified in section 7.1.7.2 of 3GPP TS 36.213 are used for both downlink and uplink.

Packet latency has above been identified as degrading network performance. One area to address when it comes to packet latency reductions is the reduction of transport time of data and control signaling, by addressing the length of a transmission time interval (TTI). In LTE release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix.

According to embodiment disclosed herein the TTIs are shortened by introducing shortened subframes (below denoted sub subframes, SSFs). With shorter TTIs, the subframes can be decided to have any duration in time and comprise resources on a number of OFDM or SC-FDMA symbols within a 1 ms subframe. As one example, the duration of a shortened subframe may be 0.5 ms, i.e., seven OFDM or SC-FDMA symbols for the case with normal cyclic prefix.

The existing TBS tables, as given in 3GPP TS 36.213, Section 7.1.7.2., are defined for a fixed length TTI of 1 ms. For a given number of assigned resource blocks, the number of available resource elements for data transmission within a shortened subframe can be significantly less as compared to the case of the legacy 1 ms TTI. Thus, the existing TBS tables cannot be used for supporting shortened subframes.

The embodiments disclosed herein relate to mechanisms for transmitting payload in a subframe. In order to obtain such mechanisms there is provided a first network device 200a, a method performed by the first network device 200a, a computer program product comprising code, for example in the form of a computer program, that when run on a first network device 200a, causes the first network device 200a to perform the method.

FIG. 2a schematically illustrates, in terms of a number of functional units, the components of a network device, denoted a first network device 200a, according to an embodiment. Processing circuitry 210 is provided using any combination of one or more of a suitable central processing unit (CPU), multiprocessor, microcontroller, digital signal processor (DSP), etc., capable of executing software instructions stored in a computer program product 310 (as in FIG. 3), e.g. in the form of a storage medium 230. The processing circuitry 210 may further be provided as at least one application specific integrated circuit (ASIC), or field programmable gate array (FPGA).

Particularly, the processing circuitry 210 is configured to cause the first network device 200a to perform a set of operations, or steps, S102-S104. These operations, or steps, S102-S104 will be disclosed below. For example, the storage medium 230 may store the set of operations, and the processing circuitry 210 may be configured to retrieve the set of operations from the storage medium 230 to cause the first network device 200a to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The first network device 200a may further comprise a communications interface 220 for communications with a second network device 200b. As such the communications interface 220 may comprise one or more transmitters and receivers, comprising analogue and digital components. The processing circuitry 210 controls the general operation of the first network device 200a e.g. by sending data and control signals to the communications interface 220 and the storage medium 230, by receiving data and reports from the communications interface 220, and by retrieving data and instructions from the storage medium 230. Other components, as well as the related functionality, of the first network device 200a are omitted in order not to obscure the concepts presented herein.

FIG. 2b schematically illustrates, in terms of a number of functional modules, the components of a first network device 200a according to an embodiment. The first network device 200a of FIG. 2b comprises a number of functional modules; an obtain module 210a configured to perform below step S102, and a transmit module 210b configured to perform below step S104. The first network device 200a of FIG. 2b may further comprises a number of optional functional modules, such as any of a scale module 210C configured to perform below step S102a, and a map module 210d configured to perform below step S102b. The functionality of each functional module 210a-210d will be further disclosed below in the context of which the functional modules 210a-210d may be used. In general terms, each functional module 210a-210d may in one embodiment be implemented only in hardware or and in another embodiment with the help of software, i.e., the latter embodiment having computer program instructions stored on the storage medium 230 which when run on the processing circuitry makes the first network device 200a perform the corresponding steps mentioned above in conjunction with FIG. 2b. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with functional units 220 and/or 230. The processing circuitry 210 may thus be configured to from the storage medium 230 fetch instructions as provided by a functional module 210a-210d and to execute these instructions, thereby performing any steps as will be disclosed hereinafter.

The first network device 200a may be provided as a standalone device or as a part of at least one further device. For example, when implemented in the network, the first network device 200a may be provided in a node of the radio access network, such as in the radio access network node 120, as a standalone device in the radio access network, in a node of the core network 150, or in a node of the service network 160. In such scenarios the second network device 200b is implemented in the wireless device 140. Alternatively, the first network device 200a is implemented in the wireless device 140 and the second network device 200b is implemented in the network.

Functionality of the first network device 200a (when implemented in the network) may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to radio access network node 120 than instructions that are not required to be performed in real time. In this respect, at least part of the first network device 200a may reside in the radio access network, such as in the radio access network node, for cases when embodiments as disclosed herein are performed in real time.

Thus, (when implemented in the network) a first portion of the instructions performed by the first network device 200a may be executed in a first device, and a second portion of the of the instructions performed by the first network device 200a may be executed in a second device; the herein disclosed embodiments are not limited to any particular number of devices on which the instructions performed by the first network device 200a may be executed. Hence, the methods according to the herein disclosed embodiments are suitable to be performed by a first network device 200a residing in a cloud computational environment. Therefore, although a single processing circuitry 210 is illustrated in FIG. 2a the processing circuitry 210 may be distributed among a plurality of devices, or nodes. The same applies to the functional modules 210a-210d of FIG. 2b and the computer program 320 of FIG. 3 (see below).

FIG. 3 shows one example of a computer program product 310 comprising computer readable storage medium 330. On this computer readable storage medium 330, a computer program 320 can be stored, which computer program 320 can cause the processing circuitry 210 and thereto operatively coupled entities and devices, such as the communications interface 220 and the storage medium 230, to execute methods according to embodiments described herein. The computer program 320 and/or computer program product 310 may thus provide means for performing any steps as herein disclosed.

In the example of FIG. 3, the computer program product 310 is illustrated as an optical disc, such as a CD (compact disc) or a DVD (digital versatile disc) or a Blu-Ray disc. The computer program product 310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320 is here schematically shown as a track on the depicted optical disk, the computer program 320 can be stored in any way which is suitable for the computer program product 310.

Figure 4:
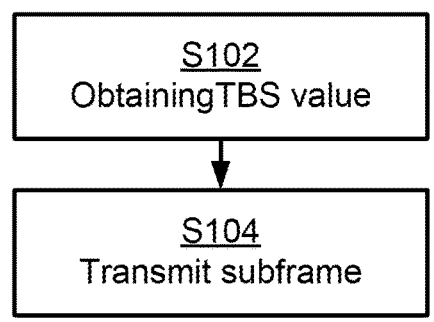
FIGS. 4 and 5 are flowcharts of methods according to embodiments.
Figure 5:
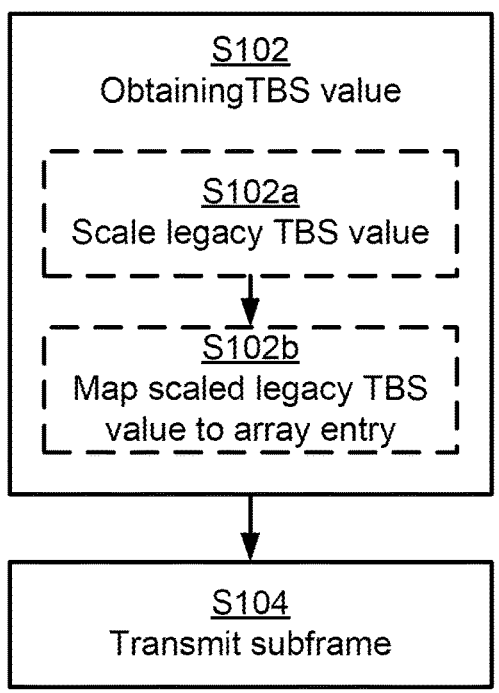

FIGS. 4 and 5 are flow chart illustrating embodiments of methods for transmitting payload in a subframe. The methods are performed by the first network device 200a. The methods are advantageously provided as computer programs 320.

Reference is now made to FIG. 4 illustrating a method for transmitting payload in a subframe as performed by the first network device 200a according to an embodiment.

It is assumed that the first network device 200a is to transmit a physical channel carrying payload in a subframe of a given subframe length. This subframe can be assumed to be shorter than a legacy subframe and hence be denoted a shortened subframe (or SSF). However, the term subframe will still be used to denote such a shortened subframe and the term legacy subframe will be used to denote a legacy subframe. The first network device 200a is therefore configured to, in a step S102, obtain a transport block size (TBS) value. The TBS values is obtained by the first network device 200a accessing an array storing a plurality of TBS values. The obtained TBS value is proportional to the number of user data symbols in a subframe of the given subframe length. One and the same array is accessed regardless of the given subframe length. In this respect the obtain module 210a may comprise instructions that when executed by the first network device 200a causes the processing circuitry 210, possibly in conjunction with the communications interface 220 and the storage medium 230, to obtain the TBS value in order for the first network device 200a to perform step S102.

The first network device 200a is then configured to, in a step S104, transmit the physical channel carrying payload in the subframe to a second network device 200b. The amount of data in the payload is determined by the TBS value. In this respect the transmit module 210b may comprise instructions that when executed by the first network device 200a causes the processing circuitry 210, possibly in conjunction with the communications interface 220 and the storage medium 230, to transmit the physical channel carrying payload in the subframe in order for the first network device 200a to perform step S104.

As will be further disclosed below, this method of obtaining the TBS value enables the reuse of existing TBS tables to support short Physical Downlink Shared Channel signalling and short Physical Uplink Shared Channel signalling of time durations less than 1 ms.

Embodiments relating to further details of transmitting payload in a subframe as performed by the first network device 200a will now be disclosed.

There may be different ways to determine the TBS value. According to one embodiment the TBS value is determined by the first network device 200a. This can represent a scenario where the first network device 200a is provided in the network, such as in a radio access network node 120, in the core network 150, in the service network 160, or as an independent node 200a in the network, and where the second network device 200b is provided in the wireless device 140. According to another embodiment the TBS value is obtained from the second network device 200b. This can represent a scenario where the first network device 200a is provided in the wireless device 140 and where the second network device 200b is provided in the network, such as in a radio access network node 120, in the core network 150, in the service network 160, or as an independent node 200b in the network.

There may be different lengths of the subframe in which the physical channel carrying payload is transmitted. For example, the subframe can have a shorter duration than a legacy transmission time interval (TTI), i.e., shorter than 1 ms. The subframe may therefore be denoted a sub-subframe (SSF). A limited set of possible sizes, of the subframe allowing the number of resource blocks to be changed between retransmissions, provides increased scheduling flexibility.

Examples of the payload carried in the physical channel include, but are not limited to, radio resource control (RRC) signalling, Voice over Internet Protocol (VoIP) data information bits, and unicast data information bits. These examples of payload can be transmitted without padding.

There may be different examples of physical channel carrying the payload. For example, the physical channel carrying payload can be a Physical Downlink Shared Channel (PDSCH), a Physical Uplink Shared Channel (PUSCH), or a Physical Sidelink Shared Channel (PSSCH). Existing link adaptation (or equivalently, adaptive modulation and coding) algorithms can be used for these physical channels.

Further, in the above disclosed scenario where the first network device 200a is provided in the network the user data symbols can be Orthogonal Frequency-Division Multiplexing (OFDM) symbols. In the above disclosed scenario where the first network device 200a is provided in the wireless device 140 the user data symbols can be Single-Carrier Frequency-Division Multiple Access (SC-FDMA) symbols. The same modulation and coding scheme (MCS) can be used independent of the number of OFDM symbols or SC-FDMA symbols in the subframe.

There may be different ways to define the array storing the plurality of TBS values. For example, the array can be defined according to 3GPP TS 36.213, Release 12, Version 12.7.0, Section 7.1.7.2. Hence the array can be defined according to Table 7.1.7.2.1-1 in 3GPP TS 36.213, Release 12, Version 12.7.0. Additionally, the array may further comprise a TBS value of 8 bits, allowing for small payloads. Hence, the herein disclosed embodiments enable reuse of existing TBS tables, as defined in 3GPP TS 36.213. The determination of "nearest" when mapping to the TBS table values can be implemented in different ways, e.g., nearest value, closest lower value or closest higher value. One particular embodiment relating to how the tables in 3GPP TS 36.213, Section 7.1.7.2 can be reused to determine the TBS value will be disclosed below.

The reuse of existing TBS tables implies minimum modifications for standardization specifications. Reusing existing TBS tables also implies that properties required for practical implementation are all kept for subframe TBS determination. Examples of such properties will be provided next. For example, the TBS value can be determined to be an integer number of bytes. For example, the TBS value can be determined to be aligned with a Quadrature Permutation Polynomial (QPP) interleaver of a given size.

According to an embodiment the array storing the plurality of TBS values is accessed using an index. The index is dependent on the number of user data symbols in the subframe. The index can, for example, be defined by a default index being scaled by the number of user data symbols in the subframe. Hence, the indexes for the array, such as in the above referenced Table 7.1.7.2.1-1 in 3GPP TS 36.213, Release 12, Version 12.7.0, can be rescaled by a factor proportional to the number of user data symbols within the subframe.

In more detail, for a certain PDSCH, PUSCH, or PSSCH, the number of assigned resource blocks (as determined according to the TBS value) can be in inverse proportion to the number of user data OFDM or SC-FDMA symbols within the subframe. To obtain the TBS of this PDSCH or PUSCH, the column indexes for existing TBS tables can be rescaled by a factor which is proportional to the number of user data symbols within the corresponding subframe.

Before disclosing how the default index can be scaled, some notations that will be useful hereinafter will be defined:

$N_{RE,d}^{SSF}$: The number of resource elements (REs) per resource block (RB) reserved for data symbols within a certain subframe;

$N_{RE}^{SSF}$: The total number of REs per RB of a certain subframe;

$N_{RE,d}^{SF}$: The number of REs per RB reserved for data symbols within a legacy TTI, corresponding to one legacy subframe duration of 1 ms;

$N_{RB}^{SSF}$: The number of assigned RBs for PDSCH or PUSCH scheduled on the subframe;

$N_{length}^{SSF}$: The length of the subframe, i.e., the number of symbols within the subframe;

$N_{length}^{SF}$: The length of a legacy TTI, corresponding to one legacy subframe duration of 1 ms. For the case of normal cyclic prefix, $N_{length}^{SF}=14$; for the case of extended cyclic prefix, $N_{length}^{SF}=12$;

$N_{symbol,CR}^{SSF}$: The number of symbols in the subframe that are within the control region for a downlink transmission;

$N_{symbol,CR}^{SF}$: The number of symbols reserved for the control region of a legacy TTI for a downlink transmission;

$N_{symbol,r}^{SSF}$: The number of reference symbols for the subframe for an uplink transmission;

α: Scaling factor for resource allocation for the PDSCH or PUSCH scheduled on the subframe;

$\lfloor N_{RB}^{SSF}/\alpha \rfloor$: The largest integer which is no greater than $N_{RB}^{SSF}/\alpha$;

$\lceil N_{RB}^{SSF}/\alpha \rceil$: The smallest integer which is no less than $N_{RB}^{SSF}/\alpha$;

round($N_{RB}^{SSF}/\alpha$): the nearest integer to $$\frac{N_{RB}^{SSF}}{\alpha}.$$

In the following, embodiments relating to how the scale factor α can be derived for a subframe of given size will be presented.

Embodiment 1: According to a first embodiment, the default index is scaled in inverse proportion to a first length, $N_{RE,d}^{SF}$, in terms of number of REs per RB reserved for data symbols within a legacy TTI, and in proportion to a second length, $N_{RE,d}^{SSF}$, in terms of number of REs per RB reserved for the user data symbols within the subframe. Hence, according to this embodiment the value of α is determined based on the number of REs reserved for data symbols of the subframe. More specifically, α is determined as:

$$\alpha = \frac{N_{RE,d}^{SF}}{N_{RE,d}^{SSF}}.$$

Embodiment 2: According to a second embodiment, the default index is scaled in inverse proportion to a difference between a third length, $N_{length}^{SF}$, in terms of number of symbols of a legacy TTI and a fourth length, $N_{symbol,CR}^{SF}$, in terms of number of symbols reserved for a control region of a legacy TTI for a downlink transmission of the physical channel carrying payload in a legacy subframe, and in proportion to a difference between a fifth length, $N_{length}^{SSF}$, in terms of symbols of the subframe and a sixth length, $N_{symbol,CR}^{SSF}$, in terms of symbols of the subframe that are within a control region for the downlink transmission of the physical channel carrying payload in the subframe. Hence, according to this embodiment the value of α depends on the length of the subframe, without the knowledge of exact reference symbol configurations. That is, for PDSCH, α is determined as:

$$\alpha = \frac{N_{length}^{SF} - N_{symbol,CR}^{SF}}{N_{length}^{SSF} - N_{symbol,CR}^{SSF}}.$$

Embodiment 3: According to a third embodiment, the default index is scaled in inverse proportion to a difference between a third length, $N_{length}^{SF}$, in terms of number of symbols of a legacy TTI and a seventh length, $N_{symbol,r}^{SF}$, in terms of number of reference symbols of a legacy TTI, and in proportion to a difference between a fifth length, $N_{length}^{SSF}$, in terms of symbols of the subframe and a eighth length, $N_{symbol,r}^{SSF}$, in terms of number of reference symbols in the subframe for an uplink transmission. Hence, according to this embodiment the value of α depends on the length of the subframe, without the knowledge of exact reference symbol configurations. That is, for PUSCH, α is determined as:

$$\alpha = \frac{N_{length}^{SF} - 2}{N_{length}^{SSF} - N_{symbol,r}^{SSF}}.$$

Figure 6:
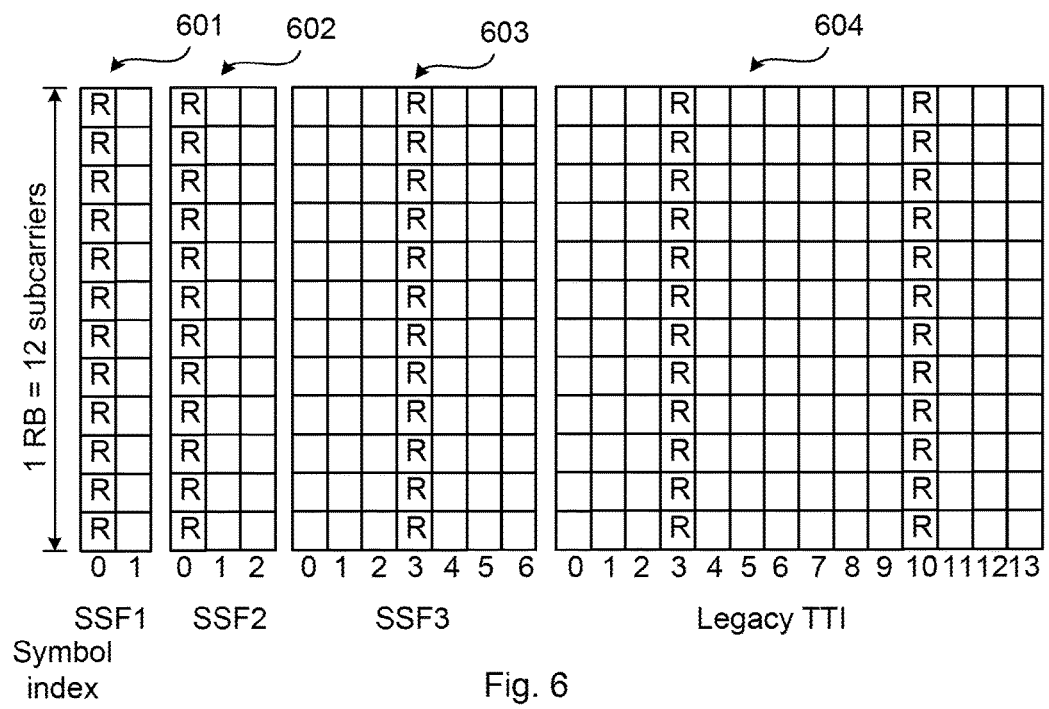
FIG. 6 schematically illustrates time-frequency grids for subframes according to embodiments.

FIG. 6 illustrates the time-frequency grids for three different subframes, dented SSF1, SSF2, and SSF3 and for a subframe (denoted Legacy TTI) of legacy length corresponding to a 1 ms TTI with normal cyclic prefix, all for uplink transmissions. Hence, for the subframes illustrated in FIG. 6, the first network device 200*a* is associated with the wireless device 140 and the second network device 200*b* is associated with the network. In FIG. 6 the allocations of reference signals are denoted by the symbol R. Table 1 and Table 2 give the value of the scaling factor α for each considered case illustrated in FIG. 6 determined according to Embodiment 1 and Embodiments 2 and 3, respectively. It is assumed that the wireless device 140 can derive the value of $N_{RB}^{SSF}$ from its corresponding downlink control information (DCI). In all tables the symbol "*" denotes multiplication.

TABLE 1

Values of $N_{RE}^{SSF}$, $N_{RE,d}^{SSF}$, and α for the SSFs illustrated in FIG. 6 with α determined as in Embodiment 1.

| | $N_{RE}^{SSF}$ | $N_{RE,d}^{SSF}$ | α (Embodiment 1) |
|---|---|---|---|
| SSF1 | 2*12 | 1*12 | 12 |
| SSF2 | 3*12 | 2*12 | 6 |

TABLE 1-continued

Values of $N_{RE}^{SSF}$, $N_{RE,d}^{SSF}$, and α for the SSFs illustrated in FIG. 6 with α determined as in Embodiment 1.

| | $N_{RE}^{SSF}$ | $N_{RE,d}^{SSF}$ | α (Embodiment 1) |
|---|---|---|---|
| SSF3 | 7*12 | 6*12 | 2 |
| Legacy TTI | 14*12 | 12*12 | 1 |

TABLE 2

Values of $N_{length}^{SSF}$, $N_{symbol,r}^{SSF}$, and α for the SSFs illustrated in FIG. 6 with α determined as in Embodiments 2 and 3.

| | $N_{length}^{SSF}$ | $N_{symbol,r}^{SSF}$ | α (Embodiments 2 and 3) |
|---|---|---|---|
| SSF1 | 2 | 1 | 12 |
| SSF2 | 3 | 1 | 6 |
| SSF3 | 7 | 1 | 2 |
| Legacy TTI | 14 | 2 | 1 |

Figure 7:
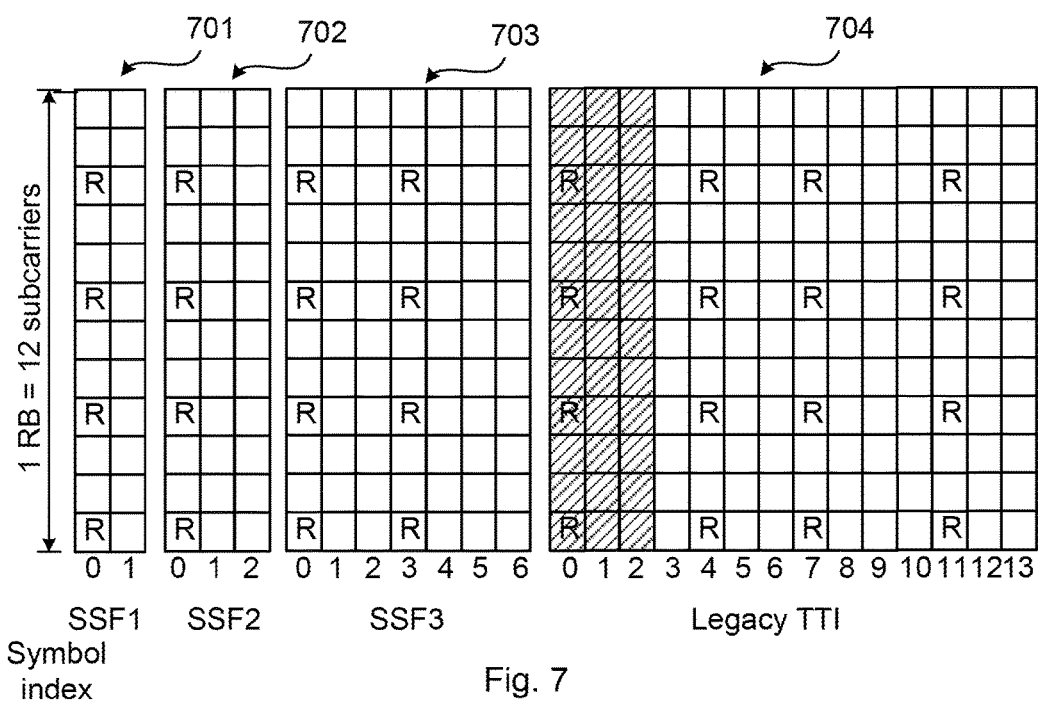
FIG. 7 schematically illustrates time-frequency grids for subframes according to embodiments.

FIG. 7 illustrates three different subframes, dented SSF1, SSF2, and SSF3 and for a subframe (denoted Legacy TTI) of legacy length corresponding to a 1 ms TTI with normal cyclic prefix, all for downlink transmissions. Hence, for the subframes illustrated in FIG. 7, the second network device 200*b* is associated with the wireless device 140 and the first network device 200*a* is associated with the network. In FIG. 7 the allocations of reference signals are denoted by the symbol R. In the subframe for Legacy 171 resources reserved for control signalling are shaded. Table 3 and Table 4 give the value of the scaling factor α for each considered case illustrated in FIG. 2 determined according to Embodiment 1 and Embodiments 2 and 3, respectively.

TABLE 3

Values of $N_{RE}^{SSF}$, $N_{RE,d}^{SSF}$, and α for the SSFs illustrated in FIG. 7 with α determined as in Embodiment 1.

| | $N_{RE}^{SSF}$ | $N_{RE,d}^{SSF}$ | α |
|---|---|---|---|
| SSF1 | 2*12 | 20 | 6 |
| SSF2 | 3*12 | 32 | 3.75 |
| SSF3 | 7*12 | 76 | 1.58 |
| Legacy TTI | 14*12 | 120 | 1 |

TABLE 4

Values of $N_{length}^{SSF}$, $N_{symbol,CR}^{SSF}$, and α for the SSFs illustrated in FIG. 7 with α determined as in Embodiments 2 and 3.

| | $N_{length}^{SSF}$ | $N_{symbol,CR}^{SSF}$ | α |
|---|---|---|---|
| SSF 1 | 2 | 0 | 5.5 |
| SSF 2 | 3 | 0 | 3.67 |
| SSF 3 | 7 | 0 | 1.57 |
| Legacy TTI | 14 | 3 | 1 |

One particular embodiment relating to how the tables in 3GPP TS 36.213, Section 7.1.7.2 can be reused to determine the TBS value will now be disclosed. This particular embodiment discloses how the TBS for a certain PDSCH or PUSCH scheduled on subframe can be determined.

Step 1: Obtain the MSC index, $I_{MCS}$, from the DCI;

Step 2: Obtain the number of assigned resource blocks, $N_{RB}^{SSF}$, and the scaling factor, α, from the DCI;

Step 3: For PDSCH, use $I_{MCS}$ and Table 7.1.7.1-1 in 3GPP TS 36.213 to determine the TBS index, $I_{TBS}$; for PUSCH, use $I_{MCS}$ and Table 8.6.1-1 in 3GPP TS 36.213 to determine the TBS index, $I_{TBS}$.

Step 4: If the transport block (TB) is not mapped to two or more layer spatial multiplexing,
    the TBS is given by the $(I_{TBS}, \lfloor N_{RB}^{SSF}/\alpha \rfloor)$ entry of Table 7.1.7.2.1-1 in 3GPP 36.213;

```
Else if the TB is mapped to two-layer spatial multiplexing, and
        If 1 ≤ ⌊N_RB^SSF/α⌋ ≤ 55, the TBS is given by the (I_TBS,2 × ⌊N_RB^SSF/α⌋)
entry of Table 7.1.7.2.1-1 in 3GPP 36.213;
        Else if 56 ≤ ⌊N_RB^SSF/α⌋ ≤ 110, the TBS is given by
           • Firstly, obtain the baseline TBS_L1 by using the (I_TBS,2 ×
             ⌊N_RB^SSF/α⌋) entry of Table 7.1.7.2.1-1 in 3GPP 36.213;
           • Then, map the TBS_L1 to TBS_L2 according to Table
             7.1.7.2.2-1 in 3GPP 36.213; The TBS is given by TBS_L2
        End if
Else if the TB is mapped to three-layer spatial multiplexing, and
        If 1 ≤ ⌊N_RB^SSF/α⌋ ≤ 36, the TBS is given by the (I_TBS,3 × ⌊N_RB^SSF/α⌋)
entry of Table 7.1.7.2.1-1 in 3GPP 36.213;
        Else if 37 ≤ ⌊N_RB^SSF/α⌋ ≤ 110, the TBS is given by
           • Firstly, obtain the baseline TBS_L1 by using the (I_TBS,
             ⌊N_RB^SSF/α⌋) entry of Table 7.1.7.2.1-1 in 3GPP 36.213;
           • Then, map the TBS_L1 to TBS_L3 according to Table
             7.1.7.2.4-1 in 3GPP 36.213; The TBS is given by TBS_L3
        End if
Else if the TB is mapped to four-layer spatial multiplexing, and
        If 1 ≤ ⌊N_RB^SSF/α⌋ ≤ 27, the TBS is given by the (I_MCS, 4 × ⌊N_RB^SSF/α⌋)
entry of Table 7.1.7.2.1-1 in 3GPP 36.213;
        Else if 28 ≤ ⌊N_RB^SSF/α⌋ ≤ 110, the TBS is given by
           • Firstly, obtain the baseline TBS_L1 by using the (I_TBS,
             ⌊N_RB^SSF/α⌋) entry of Table 7.1.7.2.1-1 in 3GPP 36.213;
           • Then, map the TBS_L1 to TBS_L4 according to Table
             7.1.7.2.5-1 in 3GPP 36.213; The TBS is given by TBS_L4
        End if
End
```

The term $\lfloor N_{RB}^{SSF}/\alpha \rfloor$ used above can be replaced by other integers, e.g., $\lceil N_{RB}^{SSF}/\alpha \rceil$ or $\text{round}(N_{RB}^{SSF}/\alpha)$.

When the value of $\lfloor N_{RB}^{SSF}/\alpha \rfloor$ or $\text{round}(N_{RB}^{SSF}/\alpha)$ is o, the TBS can be set to 8 bits.

When the value of $\lfloor N_{RB}^{SSF}/\alpha \rfloor$ or $\text{round}(N_{RB}^{SSF}/\alpha)$ is 0, a special column with index $N_{PRB}=0$, which contains TBS values for all values of $I_{TBS}$, i.e. between $0 \leq I_{TBS} \leq 26$ can be used. Here, at least one value in this column should be a TBS of 8 bits.

When the value of $\lfloor N_{RB}^{SSF}/\alpha \rfloor$ or $\text{round}(N_{RB}^{SSF}/\alpha)$ is 0, then the first column can be used, as indexed with $N_{PRB}=1$, in the tables in 3GPP TS 36.213, section 7.1.7.2.

Reference is now made to FIG. 5 illustrating methods for transmitting payload in a subframe as performed by the first network device 200a according to further embodiments.

In one embodiment the array storing the plurality of TBS values comprises a set of legacy TBS values, denoted $TBS^{SF}$. The legacy TBS values are based on modulation and coding scheme and frequency allocation for the transmission of the physical channel carrying payload in the subframe as a legacy subframe. The step of obtaining the TBS value can then further comprise scaling, in a step S102a performed by the first network device 200a, one of the legacy TBS values by the number of user data symbols in the subframe. In this respect the scale module 210c may comprise instructions that when executed by the first network device 200a causes the processing circuitry 210, possibly in conjunction with the communications interface 220 and the storage medium 230, to scale one of the legacy TBS values in order for the first network device 200a to perform step S102a. This one of the legacy TBS values can be defined according to entry $(I_{TBS}, N_{RB}^{SSF})$ in 3GPP TS 36.213, Release 12, Version 12.7.0, Table 7.1.7.2.1-1, where $N_{RB}^{SSF}$ denotes the number of resource blocks allocated to transmission of the physical channel carrying payload in the subframe.

In this embodiment a baseline TBS value can thus be obtained as in legacy systems, based on the MCS value and frequency allocation without considering the shortened TTI length. Then, this value is scaled down as $TBS^{SF}/\alpha$ (as in step S102a) to obtain the number of bits that should be allocated in the subframe. The $\alpha$ factor is obtained as previously described. This resulting number of bits may not fulfill the properties listed previously for desired TBS sizes (i.e., integer number of bytes, aligned with interleaves size, common payload, and belonging to a certain set of used payloads). Table 7.1.7.2.1-1 in 3GPP 36.213 is a 100-by-27-sized table of TBS values, but with only 178 unique values. These unique values are provided in the array 800 of FIG. 8. The scaled down TBS size $TBS^{SF}/\alpha$ can be mapped onto the nearest of these existing unique values. The step of obtaining the TBS value can therefore further comprise mapping, in a step S102b performed by the first network device 200a, the scaled down legacy TBS value to an entry of an array storing a plurality of unique TBS values. The entries of the array storing the plurality of unique TBS values can be defined by all unique TBS values in 3GPP TS 36.213, Release 12, Version 12.7.0, Table 7.1.7.2.1-1. Additionally, the array storing the plurality of unique TBS values can further comprise a TBS value of 8 bits, allowing for small payloads. In this respect the map module 210d may comprise instructions that when executed by the first network device 200a causes the processing circuitry 210, possibly in conjunction with the communications interface 220 and the storage medium 230, to map the scaled down legacy TBS value to the entry of the array storing the plurality of unique TBS value in order for the first network device 200a to perform step S102b. The implementation of the mapping in step S102b onto one of the 178 values can e.g. be performed as a linear or binary search. To speed up the search, an approximate position choosing the starting value can be given by that the unique values are approximately linearly spread for low sizes, and approximately exponentially growing for high values. By mapping to one of the existing TBS sizes, the four properties described above will be maintained. As above, the determination of "nearest" when mapping to the TBS table values can be implemented in different ways, e.g., nearest value, closest lower value or closest higher value.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for transmitting payload in a subframe, the method being performed by a first network device, the method comprising:
 accessing, using an index, an array storing a plurality of transport block size, TBS, values wherein the array is accessed regardless of a given subframe length, wherein the index is dependent on a number of user data symbols in the subframe and is defined by a default index that is resealed by a factor that is proportional to the number of user data symbols in the subframe;
 obtaining a TBS value based on accessing the array, wherein the TBS value is proportional to a number of user data symbols in a subframe of a first subframe length;
 determining an amount of data in a payload by the TBS value; and
 transmitting a physical channel carrying a payload in the subframe having the determined amount of data to a second network device.

2. The method according to claim 1, wherein the array is accessed using an index, the index being dependent on the number of user data symbols in the subframe.

3. The method according claim 1, wherein the default index is scaled in inverse proportion to a first length, $N_{RE,d}^{SF}$, in terms of number of resource elements, REs, per resource block, RB, reserved for data symbols within a legacy transmission time interval, TTI, and in proportion to a second length, $N_{RE,d}^{SSF}$, in terms of number of REs per RB reserved for the user data symbols within the subframe.

4. The method according claim 1, wherein the default index is scaled in inverse proportion to a difference between a third length, $N_{length}^{SF}$, in terms of number of symbols of a legacy transmission time interval, TTI, and a fourth length, $N_{symbol,CR}^{SF}$, in terms of number of symbols reserved for a control region of a legacy TTI for a downlink transmission of the physical channel carrying payload in a legacy subframe, and in proportion to a difference between a fifth length, $N_{length}^{SSF}$, in terms of symbols of the subframe and a sixth length, $N_{symbol,CR}^{SSF}$, in terms of symbols of the subframe that are within a control region for the downlink transmission of the physical channel carrying payload in the subframe.

5. The method according claim 1, wherein the default index is scaled in inverse proportion to a difference between a third length, $N_{length}^{SF}$, in terms of number of symbols of a legacy transmission time interval, TTI and a seventh length, $N_{symbol,r}^{SF}$, in terms of number of reference symbols of a legacy transmission time interval, TTI, and in proportion to a difference between a fifth length, $N_{length}^{SSF}$, in terms of symbols of the subframe and a eighth length, $N_{symbol,r}^{SSF}$, in terms of number of reference symbols in the subframe for an uplink transmission.

6. The method according to claim 1, wherein the array is defined according to 3GPP TS 36.213, Release 12, Version 12.7.0, Section 7.1.7.2.

7. The method according to claim 6, wherein the array further comprises a TBS value of 8 bits.

8. The method according to claim 1, wherein the array comprises a set of legacy TBS values, $TBS^{SF}$, wherein the legacy TBS values are based on modulation and coding scheme and frequency allocation for the transmission of the physical channel carrying payload in the subframe as a legacy subframe; and wherein obtaining the TBS value further comprises:
 scaling one of the legacy TBS values by the number of user data symbols in the subframe.

9. The method according to claim 8, wherein the one of the legacy TBS values is defined according to entry ($I_{TBS}$, $N_{RB}^{SSF}$) in 3GPP TS 36.213, Release 12, Version 12.7.0, Table 7.1.7.2.1-1, where $N_{RB}^{SSF}$ denotes number of resource blocks allocated to transmission of the physical channel carrying payload in the subframe.

10. The method according to claim 8, further comprising:
 mapping a scaled down legacy TBS value to an entry of an array storing a plurality of unique TBS values.

11. The method according to claim 10, wherein the entries of the array storing the plurality of unique TBS values are defined by all unique TBS values in 3GPP TS 36.213, Release 12, Version 12.7.0, Table 7.1.7.2.1-1.

12. The method according to claim 11, wherein the array storing the plurality of unique TBS values further comprises a TBS value of 8 bits.

13. The method according to claim 1, wherein the physical channel carrying payload is a Physical Downlink Shared Channel, PDSCH, a Physical Uplink Shared Channel, PUSCH, or a Physical Sidelink Shared Channel, PSSCH.

14. The method according to claim 1, wherein the user data symbols are Orthogonal Frequency-Division Multiplexing, OFDM, symbols, or Single-Carrier Frequency-Division Multiple Access, SC-FDMA, symbols.

15. The method according to claim 1, wherein the payload represents radio resource control, RRC, signalling, or Voice over Internet Protocol, VoIP, data information bits, or unicast data information bits.

16. The method according to claim 1, wherein the TBS value is determined to be an integer number of bytes.

17. The method according to claim 1, wherein the TBS value is determined to be aligned with a Quadrature Permutation Polynomial, QPP, interleaver of a given size.

18. The method according to claim 1, wherein the subframe has a shorter duration than a legacy transmission time interval, TTI, of 1 ms.

19. The method according to claim 1, wherein the TBS value is determined by the first network device.

20. The method according to claim 1, wherein the TBS value is obtained from the second network device.

21. A network device for transmitting payload in a subframe, the network device comprising processing circuitry, the processing circuitry being configured to cause the network device to:
 obtain, via an index, a transport block size, TBS, value by accessing an array storing a plurality of TBS values, wherein the TBS value is proportional to a number of user data symbols in a subframe of a first subframe length, and wherein one and the same array is accessed regardless of the given subframe length and wherein the index is dependent on a number of user data symbols in the subframe and is defined by a default index that is resealed by a factor that is proportional to the number of user data symbols in the subframe; and transmit a physical channel carrying payload in the subframe to a second network device, wherein amount of data in the payload is determined by the TBS value.

* * * * *